(12) United States Patent
Kwak

(10) Patent No.: US 7,849,072 B2
(45) Date of Patent: Dec. 7, 2010

(54) LOCAL TERMINAL SEARCH SYSTEM, FILTERING METHOD USED FOR THE SAME, AND RECORDING MEDIUM STORING PROGRAM FOR PERFORMING THE METHOD

(75) Inventor: Yong Jae Kwak, Seoul (KR)

(73) Assignee: NHN Corporation, Seongnam-si (KR)

( * ) Notice: Subject to any disclaimer, the term of this patent is extended or adjusted under 35 U.S.C. 154(b) by 328 days.

(21) Appl. No.: 11/678,778

(22) Filed: Feb. 26, 2007

(65) Prior Publication Data
US 2007/0203916 A1 Aug. 30, 2007

(30) Foreign Application Priority Data
Feb. 27, 2006 (KR) ........................ 10-2006-0018877

(51) Int. Cl.
*G06F 7/00* (2006.01)
*G06F 12/00* (2006.01)
(52) U.S. Cl. .................. 707/711; 707/707; 707/830
(58) Field of Classification Search .................. None
See application file for complete search history.

(56) References Cited

U.S. PATENT DOCUMENTS

| | | | | |
|---|---|---|---|---|
| 5,963,944 | A * | 10/1999 | Adams | 1/1 |
| 6,094,649 | A * | 7/2000 | Bowen et al. | 707/711 |
| 6,243,713 | B1 * | 6/2001 | Nelson et al. | 707/104.1 |
| 6,457,017 | B2 * | 9/2002 | Watkins et al. | 707/103 R |
| 6,738,758 | B1 * | 5/2004 | Li et al. | 709/223 |
| 6,999,957 | B1 * | 2/2006 | Zamir et al. | 707/673 |
| 7,024,452 | B1 * | 4/2006 | O'Connell et al. | 709/203 |
| 7,308,464 | B2 * | 12/2007 | Nowitz et al. | 707/104.1 |
| 2003/0120875 | A1 * | 6/2003 | Bourne et al. | 711/144 |
| 2003/0126247 | A1 * | 7/2003 | Strasser et al. | 709/223 |
| 2004/0220926 | A1 * | 11/2004 | Lamkin et al. | 707/3 |
| 2005/0049996 | A1 * | 3/2005 | Srinivasan et al. | 707/1 |
| 2005/0066194 | A1 * | 3/2005 | Campbell et al. | 713/201 |
| 2005/0071741 | A1 | 3/2005 | Acharya et al. | |
| 2005/0091287 | A1 * | 4/2005 | Sedlar | 707/200 |

(Continued)

OTHER PUBLICATIONS

MSN Desktop Search (beta) Mar. 2, 2005 PC Magazine (pcmag.com).*

(Continued)

*Primary Examiner*—Neveen Abel Jalil
*Assistant Examiner*—Polina Peach
(74) *Attorney, Agent, or Firm*—H.C. Park & Associates, PLC

(57) ABSTRACT

A local terminal search system is provided, which includes a search request processing unit, a search/index unit, a filtering unit, and a complex-structured file preprocessing unit. The search request processing unit receives search request information and converts search result information into prescribed document format and provides it to a search interface program. The search/index unit searches a local terminal using a search keyword in the search request information to generate search result information and indexes information stored in the terminal. The filtering unit collects information of files stored in the terminal for filtering and determines if a file corresponding to the collected information is a complex-structured file which requires more than a prescribed threshold time for filtering and filters the file if it is not a complex-structured file. If it is a complex-structured file, the file preprocessing unit extracts or generates information required for filtering to generate preprocessed information segments.

14 Claims, 9 Drawing Sheets

U.S. PATENT DOCUMENTS

2005/0154723 A1* 7/2005 Liang ............................ 707/3
2006/0085490 A1* 4/2006 Baron et al. ................ 707/200
2007/0055689 A1* 3/2007 Rhoads et al. ............. 707/102

OTHER PUBLICATIONS

Google Desktop (beta) Search your own computer About Google Desktop Search 2004 Google http://web.archive.org/web/20041016060041/desktop.google.com/screenshots.html.*

Kunal Kundaje Windows Desktop Search 2005 http://kunal.kundaje.net/reviews/wds.html.*

Benjamin Turnbull, Barry Blundell, Jill Slay Google Desktop as a Source of Digital Evidence International Journal of Digital Evidence Fall 2006, vol. 5, Issue 1.*

Gulrukh Ahanger and Thomas D. C. Little A Survey of Technologies for Parsing and Indexing Digital Video Journal of Visual Communication and Image Representation vol. 7, No. 1, March, pp. 28-43, 1996.*

Lawrence Reeve Improving Search Precision Using Google Desktop Search Dr. Dobb's Journal, Nov. 2005.*

Zongming Fei, Mengkun Yang A Segmentation-Based Fine-Grained Peer Sharing Technique for Delivering Large Media Files in Content Distribution Networks IEEE Transactions on Multimedia, vol. 8, No. 4, 2006.*

\* cited by examiner

LOCAL TERMINAL SEARCH SYSTEM, FILTERING METHOD USED FOR THE SAME, AND RECORDING MEDIUM STORING PROGRAM FOR PERFORMING THE METHOD

CROSS-REFERENCE TO RELATED APPLICATION

This application claims the benefit of Korean Patent Application No. 10-2006-0018877, filed on Feb. 27, 2006, in the Korean Intellectual Property Office, the disclosure of which is incorporated herein by reference.

BACKGROUND OF THE INVENTION

1. Field of the Invention

The present invention relates to a local terminal search system, and more particularly to a local terminal search system, a filtering method used for the same, and a recording medium that stores a program for performing the method, which can minimize a search response delay caused by filtering and indexing processes when a request to search data stored in a local terminal has been made.

2. Description of the Related Art

Due to increase storage space and increased data processing performance of local terminals, users can store a large amount of documents, image files, mails, moving images, or the like in their local terminals. It is necessary to allow users to search data stored in local terminals since it is practically impossible for users to memorize a large number of file names and directories of files of a large amount of data.

Local terminals provide a file search function or the like which allows the user to search data in the local terminals. However, the file search function requires that the user know part of a file name to be searched for. For example, when the user desires to search for document files associated with 'patent search report' in the local terminal, the user cannot find any corresponding file in the local terminal even by inputting a corresponding keyword such as 'patent', 'search', or 'report' if any corresponding file in the local terminal does not contain a word 'patent', 'search', or 'report' in its file name.

Thus, a desktop search service has been introduced for more efficient search of data stored in the local terminal. When the user inputs a keyword through a deskbar, a toolbar, or a web browser, the desktop search service searches the local terminal for data associated with the input keyword. For the local terminal search, filtering or indexing is performed on data stored in the local terminal to build an index database.

FIG. 1 illustrates an example of a conventional local terminal search system. As shown in FIG. 1, the conventional local terminal search system includes a search interface program 100, a search request processing unit 102, a file collection unit 104, a master filtering unit 106, a search/index unit 108, a slave filtering unit 110, and an index database 112.

The search interface program 100 functions to receive a search request from a user and then to provide a search result to the user.

The search request processing unit 102 transfers search request information including keyword information inputed by the user to the search/index unit 108 and converts a search result generated by the search/index unit 108 into a prescribed document format to provide it to the search interface program 100.

The search/index unit 108 receives search request information from the search request processing unit 102 and searches data stored in the local terminal using search keyword and search category information included in the search request information. The search/index unit 108 performs searching using index information stored in the index database 112 and generates and provides search result information to the search request processing unit 102.

The file collection unit 104 functions to collect file information stored in the local terminal. The file information collected by the file collection unit 104 is provided to the master filtering unit 106. The master filtering unit 106 provides file path information included in the collected file information to the slave filtering unit 110. Filtering is performed at the slave filtering unit 110.

To filter a file at the slave filtering unit 110 and then to store the filtered file in the index database 112, it takes 1-2 seconds when it is an image file, 2-3 seconds when it is an audio file, and 5-8 seconds when it is a moving image file.

A process for filtering a file and a process for storing it in the index database 112 are regarded as an atomic operation until one session is completed. Accordingly, until the filtering and indexing processes are completed, the thread lock is not released even when a search request has been received from the user during such processes.

Thus, the conventional local terminal search method has a problem in that the user must wait up to 8 seconds or longer. In addition, when an initial indexing process is performed, file collection is delayed or the response to a dynamic change of file change is not immediate since a main thread of a main processor of the master filter unit must wait until the slave filter unit completes the above processes.

SUMMARY OF THE INVENTION

Therefore, the present invention has been made in view of the above problems, and it is an object of the present invention to provide a local terminal search system, a filtering method used for the same, and a recording medium that stores a program for performing the method, which can minimize the delay of a response to a search request even when the user has made the search request during filtering and indexing processes.

It is another object of the present invention to provide a local terminal search system, a filtering method used for the same, and a recording medium that stores a program for performing the method, wherein filtering is performed in different manners for files which require a long time for filtering and indexing processes and files which do not require a long time for the processes.

It is another object of the present invention to provide a local terminal search system, a filtering method used for the same, and a recording medium that stores a program for performing the method, which can minimize the time required for filtering by performing a preprocessing process on files which require a long time for filtering and indexing processes.

In accordance with one aspect of the present invention, the above and other objects can be accomplished by the provision of a local terminal search system that searches information stored in a local terminal, the system comprising a search request processing unit that receives search request information, converts search result information into a prescribed document format, and provides the converted search result information to a search interface program; a search/index unit that performs searching using a search keyword included in the search request information to generate search result information and performs indexing of information stored in the local terminal; a filtering unit that collects information of files stored in the local terminal in order to perform filtering, determines whether or not a file corresponding to the collected file information is a complex-structured file, and performs filtering of the file corresponding to the collected file information if the corresponding file is not a complex-structured file, the complex-structured file being defined as a file that requires a prescribed threshold time or more for filtering of the file; and a complex-structured file preprocessing unit that extracts or generates information required for filtering of the file corresponding to the file information collected by the filtering unit to generate preprocessed information segments if the corresponding file is a complex-structured file, wherein a preprocessed file generated by combining the preprocessed information segments is stored in a snapshot database and the filtering unit performs filtering of the preprocessed file stored in the snapshot database.

The complex-structured file may include a moving image file or an audio file and the filtering unit determines whether or not a file is a complex-structured file using extension information of the file.

The preprocessed information segment may include a segment or a combination of segments selected from the group consisting of a file name information segment, an extension information segment, a path information segment, a capacity information segment, a meta information segment, and a capture image information segment.

The preprocessed file includes a header and respective fields that store the preprocessed information segments and each of the fields is set to be variable in length and the header stores start offset information of each of the fields.

The filtering unit includes an idle time monitoring unit that determines whether or not the local terminal is in an idle time; a file collection unit that collects information of files stored in the local terminal if the local terminal is in an idle time and determines whether or not a file corresponding to the collected file information is a complex-structured file and provides the collected file information to the complex-structured file preprocessing unit if the file corresponding to the collected file information is a complex-structured file; and a filter that receives a file that is not a complex-structured file from the file collection unit and performs filtering of the file, wherein the idle time monitoring unit monitors whether or not a new preprocessed file has been stored in the snapshot database and, if a new preprocessed file has been stored in the snapshot database, the file collection unit provides the new preprocessed file to the filter.

The complex-structured file preprocessing unit may include a queue that stores complex-structured file information provided from the filter; a file extraction thread that extracts complex-structured file information to be preprocessed from the queue; and a preprocessed information segment generator that analyzes a file provided from the file extraction thread and extracts or generates information required for filtering.

When the search request processing unit receives search request information, the search/index unit determines whether or not filtering is in progress at the filtering unit and processes a corresponding search request after waiting until filtering is completed if the determination is that filtering is in progress.

The preprocessed information segment generator generates preprocessed information segments for a prescribed timeout time and terminates a corresponding preprocessing process if the prescribed timeout time has elapsed.

In accordance with another aspect of the present invention, there is provided a filtering method used for a local terminal search system, the filtering method comprising collecting file information stored in a local terminal; determining whether or not a file corresponding to the collected file information is a complex-structured file, the complex-structured file being defined as a file that requires a prescribed threshold time or more for filtering of the file; performing filtering of the file corresponding to the collected file information if the corresponding file is not a complex-structured file; extracting or generating information required for filtering of the corresponding file to generate preprocessed information segments if the corresponding file is a complex-structured file; combining the generated preprocessed information segments to generate a preprocessed file; and storing the generated preprocessed file in a snapshot database.

In accordance with yet another aspect of the present invention, there is provided a recording medium that stores a program for performing a filtering method used in a local terminal search system, the program comprising a file collection module that collects information of files stored in a local terminal and determines whether or not a file corresponding to the collected file information is a complex-structured file, the complex-structured file being defined as a file that requires a prescribed threshold time or more for filtering of the file; a filtering module that performs filtering of the file corresponding to the file information collected by the file collection module if the corresponding file is not a complex-structured file; and a complex-structured file preprocessing module that extracts or generates information required for filtering of the file corresponding to the file information collected by the file collection module to generate preprocessed information segments if the corresponding file is a complex-structured file, wherein a preprocessed file generated by combining the preprocessed information segments is stored in a snapshot database and the filtering module performs filtering of the preprocessed file stored in the snapshot database.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will now be described with reference to the accompanying drawings.

As used in this application, the terms "module", "component" and "unit" are intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 1:
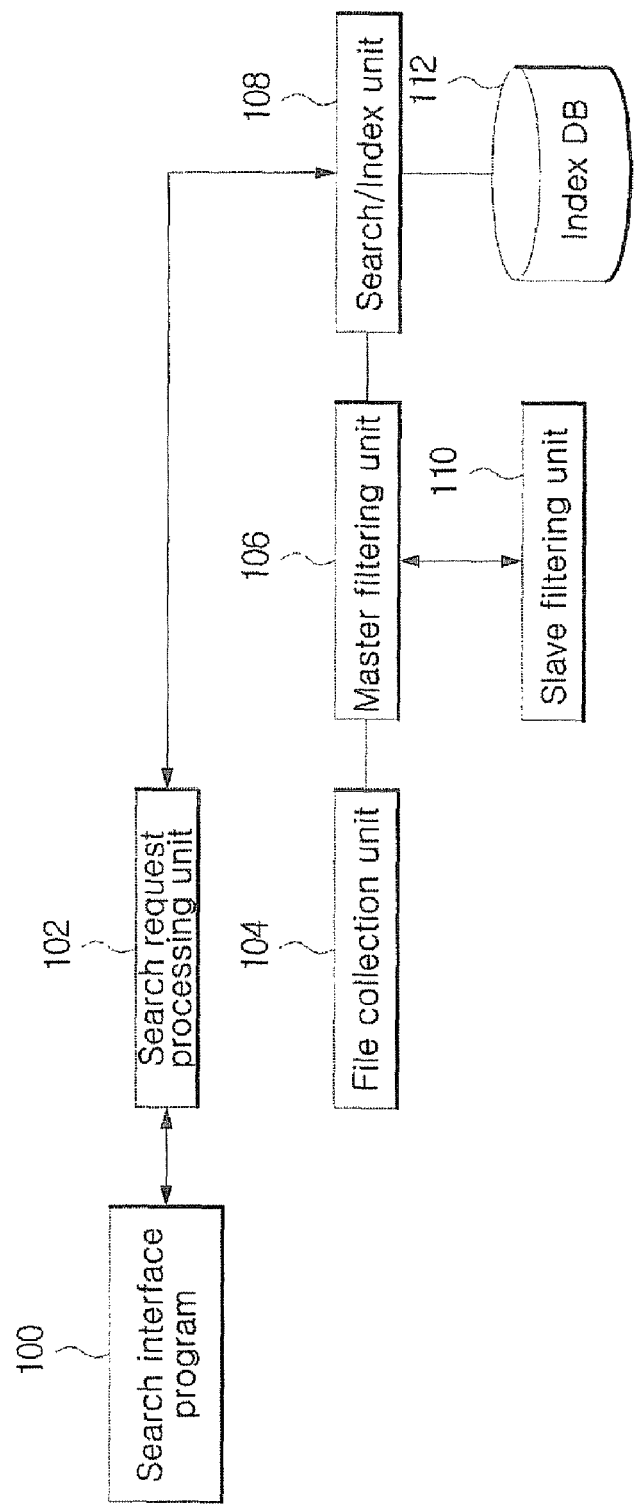
FIG. 1 illustrates an example of a conventional local terminal search system.
Figure 2:
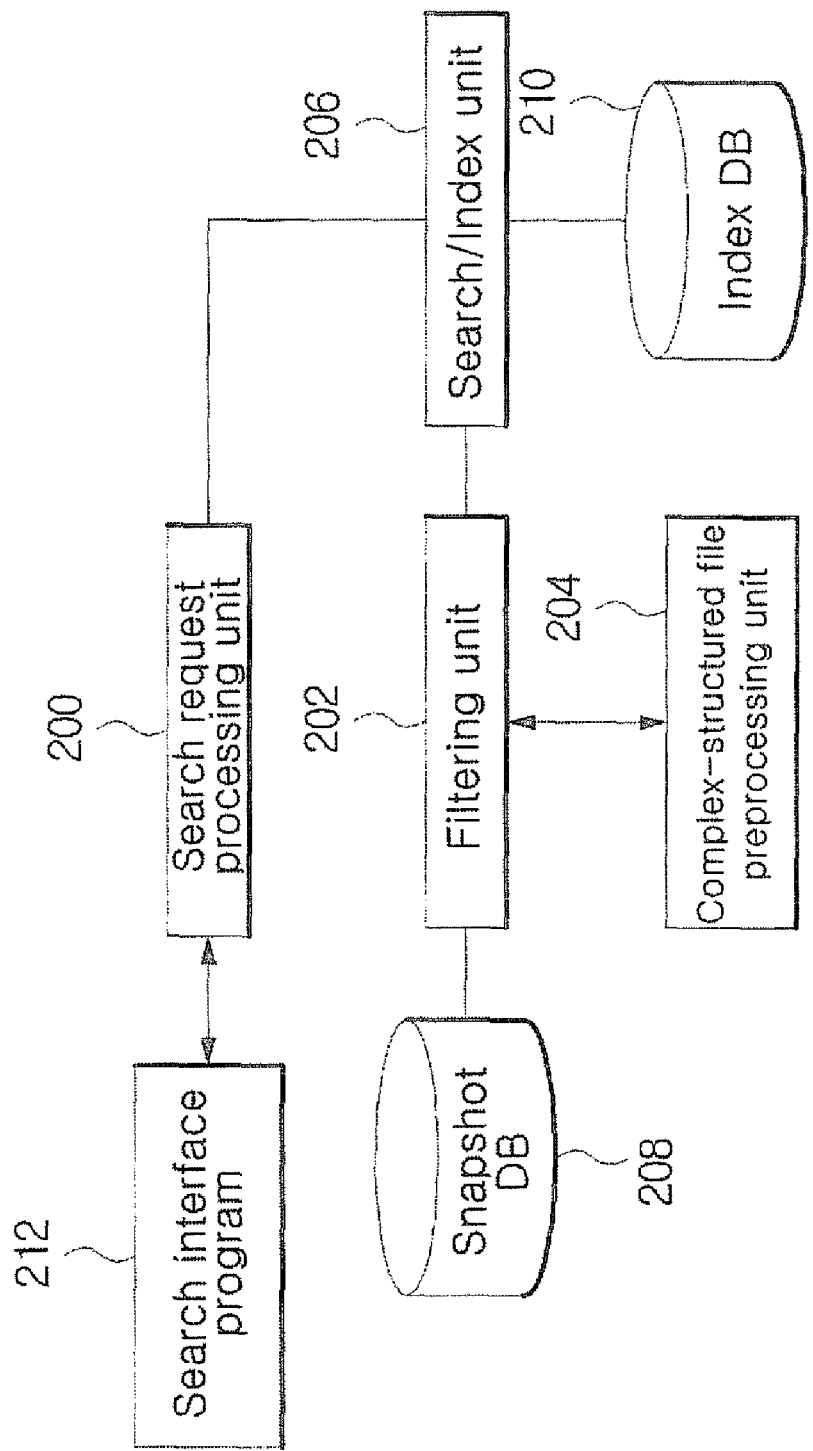
FIG. 2 illustrates the configuration of a local terminal search system according to a preferred embodiment of the invention.

FIG. 2 illustrates the configuration of a local terminal search system according to an embodiment of the invention. As shown in FIG. 2, the local terminal search system according to the embodiment of the invention includes a search request processing unit 200, a filtering unit 202, a complex-structured file preprocessing unit 204, a search/index unit 206, a snapshot database 208, and an index database 210. The local terminal search system operates in combination with a search interface program 212.

The search interface program 212 generates a search request information containing a search keyword that a user inputs through an input interface and provides the search request information to the search request processing unit 200. The search interface program 212 receives a search result corresponding to the search request information from the search request processing unit 200 and provides the search result in a prescribed document format to the user. The user can input a search category such as document, image, webpage, or moving image together with the search keyword. In this case, the search request information may also include search category information.

The search interface program 212 may be a dedicated program that is specially created to perform searching at the local terminal. A program such as a web browser that has already been installed on the local terminal may also be used as the search interface program 212. When a web browser is used as the search interface program 212, the web browser displays an input interface, which allows the user to input a search keyword on the web browser, and outputs and provides a search result corresponding to the search keyword in a Hyper Text Markup Language (HTML) format to the user.

The search request processing unit 200 transfers the search request information received from the search interface program 212 to the search/index unit 206. The search request processing unit 200 can convert the search request information into a prescribed format. For example, the search request processing unit 200 can convert the search request information into a query format to allow the search/index unit 206 to extract a search result from the index database 210.

The search request processing unit 200 converts the search result generated by the search/index unit 206 into a prescribed document format and provides it to the search interface program 212.

In an embodiment, when a web browser is used as the search interface program 212, the search request processing unit 200 may be a web server module installed on the local terminal. In this case, the web server module receives search request information from the web browser and provides a search result to the web browser through the HTTP protocol. The web server module converts search result information provided from the search/index unit 206 into a web document of HTML format and provides it to the web browser.

The search/index unit 206 receives search request information from the search request processing unit 200 and searches data stored in the local terminal using a search keyword and search category information included in the search request information and then generates and provides search result information to the search request processing unit 200. The search/index unit 206 performs the searching using index information stored in the index database 210.

The search/index unit 206 performs indexing of data stored in the local terminal using information provided from the filtering unit 202 and stores index information in the index database 210.

The filtering unit 202 searches files stored in the local terminal to perform a filtering operation for indexing of the files stored in the local terminal. The filtering operation is an operation for extracting information elements for use as index information from the files stored in the local terminal. For example, when the files to be filtered are document files, the filtering unit 202 extracts information such as file names, extensions, paths, capacities, and dates of the document files and all or part of the content of the documents. When the files to be filtered are image files, the filtering unit 202 extracts information such as file names, extensions, paths, capacities, dates, and tags of the image files and generates thumbnail information of the images. When the files to be filtered are moving image files, the filtering unit 202 extracts information such as file names, extensions, paths, capacities, dates, and tags of the moving image files and generates capture images of the moving image files.

The filtering unit 202 according to an embodiment of the invention performs a prescribed filtering operation according to the type of the files in order to minimize a search response delay that occurs when processing a search request received during the filtering operation. For example, when the file to be filtered is a moving image file which requires a long time for filtering, the filtering unit 202 previously converts format of the file into an easy-to-process format and then performs filtering of the converted file, thereby reducing the time required for the filtering. The type of the file may be identified using extension information of the file.

Specifically, the filtering unit 202 determines whether the file to be filtered is a file such as a document file which requires a short filtering time or a file (hereinafter referred to as a complex-structured file) such as a moving image file which requires a long filtering time. If the file to be filtered is a complex-structured file, the filtering unit 202 provides the complex-structured file to the complex-structured file preprocessing unit 204 so as to perform a preprocessing operation of the file. The filtering unit 202 and the complex-structured file preprocessing unit 204 operate as separate threads.

Thereafter, the information filtered by the filtering unit 202 is provided to the search/index unit 206 and the search/index unit 206 indexes and stores the filtered information in the index database 210.

The complex-structured file preprocessing unit 204 performs preprocessing of a complex-structured file such as a moving image file to allow the filtering unit 202 to perform filtering of the complex-structured file in a short time. Here, the preprocessing is an operation for previously extracting or generating information required for the filtering. For example, when the complex-structured file preprocessing unit 204 receives a moving image file whose extension is avi from the filtering unit 202, the complex-structured file preprocessing unit 204 extracts information such as a file name, extension, path, capacity, date, and tag of the avi file. In addition, the complex-structured file preprocessing unit 204 opens the avi file through a prescribed moving image player (for example, Window Media Player) and generates a capture image of the avi file.

The information extracted or generated by the complex-structured file processing 204 is provided back to the filtering unit 202. The filtering unit 202 combines the extracted or generated information to generate a preprocessed file and then stores the preprocessed file in the snapshot database 208. According to another embodiment of the invention, the complex-structured file preprocessing unit 204 may combine information extracted or generated through preprocessing to generate a preprocessed file and then store the preprocessed file in the snapshot database 208.

Thereafter, the filtering unit 202 performs final filtering of the complex-structured file using the preprocessed file stored in the snapshot database 208 during a period of time in which the processor of the local terminal can afford to perform the filtering. Since information which requires a long time for filtering of the complex-structured file has already been preprocessed and stored in the snapshot database 208, the filtering unit 202 can perform the filtering in a short time using the preprocessed file stored in the snapshot database 208.

According to the preferred embodiment of the invention described above, the filtering unit 202 processes files, which only require a short time for filtering of the files, at any time, the filtering unit 202 can minimize the delay of a response to a search request received from the user even if the search request is received during the filtering.

Figure 3:
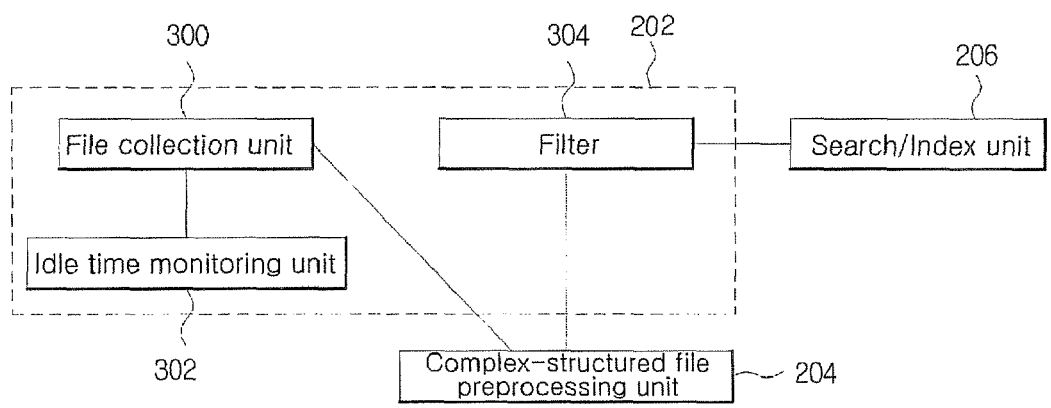
FIG. 3 is a block diagram illustrating a filtering unit according to a preferred embodiment of the invention.

FIG. 3 is a block diagram illustrating a filtering unit according to a preferred embodiment of the invention. As shown in FIG. 3, the filtering unit 202 may include a file collection unit 300, an idle time monitoring unit 302, and a filter 304.

The idle time monitoring unit 302 performs idle-time monitoring of the local terminal. It is desirable that the local terminal perform the filtering for indexing in a time zone in which the filtering is not a burden to the local terminal (i.e., in which the local terminal can afford to perform the filtering). The idle time monitoring unit 302 functions to monitor (or check) whether or not the local terminal is in a time or period when the filtering is not a burden to the local terminal.

According to an embodiment of the invention, the idle time may be defined as the time or period when the CPU usage of the local terminal is equal to or less than a prescribed level. Not only the CPU usage but also memory usage or input device or drive usage may be used as a parameter required to determine whether or not the local terminal is in an idle time (i.e., whether or not the local terminal is in idle state).

The idle time monitoring unit 302 may monitor the usage of the CPU, the memory, or the like of the local terminal to determine whether or not the local terminal is in an idle time. If the local terminal is kept in an idle time exceeding a prescribed threshold period (i.e., if the local terminal is kept in idle state for more than a prescribed threshold period), the idle time monitoring unit 302 may provide filtering start control information to the file collection unit 300. For example, the idle time monitoring unit 302 may provide filtering start control information to the file collection unit 300 if the local terminal is kept in an idle time exceeding 15 seconds.

The file collection unit 300 functions to collect file information of files to be filtered among the files stored in the local terminal. The file collection unit 300 also functions to detect a file change event for the purpose of file information collection when a change is made to the files stored in the local terminal (for example, when a new file is stored or a stored file is deleted). For example, when a new moving image file is stored, the file collection unit 300 detects an event indicating that a new moving image has been stored.

The file information to be collected by the file collection unit 300 may include information of document files, image files, moving image files, mails, and messenger conversation text files or may include the preprocessed file stored in the snapshot database.

According to an embodiment of the invention, the file collection unit 300 may use extension information of each file to determine whether or not it is a file whose information is to be collected for the filtering. For example, the file collection unit 300 determines that a file whose extension is doc is a file whose information is to be collected and that a file whose extension is tmp is a file whose information is not to be collected.

The file collection unit 300 determines whether or not a file corresponding to the collected file information is a complex-structured file. If the file corresponding to the collected file information is a complex-structured file, the file collection unit 300 provides the complex-structured file information to the complex-structured file preprocessing unit 204. If the file corresponding to the collected file information is not a complex-structured file, the file collection unit 300 provides the collected file information to the filter 304. This file information may be file path information. The file collection unit 300 may also collect file information stored in the snapshot database 208 and provide it to the filter 304.

Immediately after a program for searching the local terminal is installed on the local terminal, no filtered and indexed file information is stored in the index database 210. Accordingly, the file collection unit 300 searches files in the local terminal in each idle time and provides file information for indexing to the filter 304 or the complex-structured file preprocessing unit 204.

The filter 304 performs filtering of a file corresponding to the file information provided from the file collection unit 300. As described above, filtering of files is performed in different manners depending on the types of the files such as a document file and an image file. Contrary to the conventional method, files (for example, a document file and information stored in the snapshot database) which only require a short time for filtering, rather than complex-structured files, are provided to the filter 304, so that the filter 304 does not require a long time to perform filtering of the files. Data filtered by the filter 304 is provided to the search/index unit 206.

According to an embodiment of the invention, the filter 304 may combine information generated by the complex-structured file preprocessing unit 204 and then generate and store a preprocessed file in the snapshot database 208. This operation may also be performed by the complex-structured file preprocessing unit 204 as described above.

Figure 4:
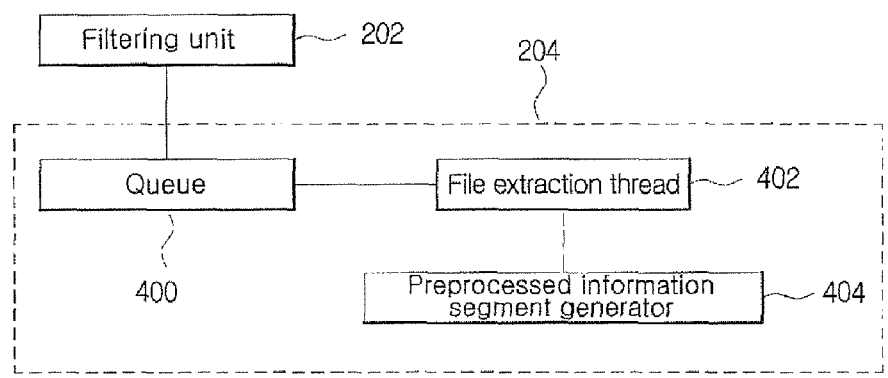
FIG. 4 is a block diagram illustrating the configuration of a complex-structured file preprocessing unit according to a preferred embodiment of the invention.

FIG. 4 is a block diagram illustrating the configuration of a complex-structured file preprocessing unit according to a preferred embodiment of the invention. As shown, the complex-structured file preprocessing unit 204 may include a queue 400, a file extraction thread 402, and a preprocessed information segment generator 404.

The queue 400 stores file information provided from the file collection unit 300 included in the filtering unit 202. As described above, the file information includes file path information and may further include information such as file type and capacity as needed. Similar to general queues, the queue 400 of the invention stores and outputs information provided from the file collection unit 300 in a First Input First Output (FIFO) manner.

The file extraction thread 402 functions to extract file information stored in the queue 400 and to request that the preprocessed information segment generator 404 perform preprocessing of a file corresponding to the file information. The file extraction thread 402 is a separate one from the filtering thread of the filtering unit 202 and an operation for extracting file information and a corresponding preprocessing operation are performed separately.

The preprocessed information segment generator 404 performs a filtering preprocessing operation. Specifically, the preprocessed information segment generator 404 functions to generate, prior to filtering, information segments required for the filtering of a file corresponding to file information provided from the file extraction thread 402. For example, when a file to be preprocessed is a moving image file, the preprocessed information segment generator 404 generates a file name information segment, an extension information segment, a path information segment, a capacity information segment, a meta information segment, and a capture image information segment of the moving image file.

The file name information segment, the extension information segment, the path information segment, and the capacity information segment may be generated with reference to file information of the moving image file. The meta information segment may be generated by analyzing tag information of the moving image file. The capture image information segment may be generated by running a prescribed moving image player (for example, Window Media Player) to open the moving image file and then capturing part of its moving image that is being played.

The preprocessed information segments generated by the preprocessed information segment generator 404 are combined to be stored in the snapshot database 208. As described above, the filter 304 in the filtering unit 202 may combine the preprocessed information segments to generate a preprocessed file and then store it in the snapshot database 208. Alternatively, the preprocessed information segment generator 404 may itself combine the preprocessed information segments to generate a preprocessed file and then store it in the snapshot database 208. The file collection unit 300 included in the filtering unit 202 collects the preprocessed file stored in the snapshot database 208 and provides it to the filter 304, which performs final filtering.

According to a preferred embodiment, the preprocessed information segment generator 404 performs the preprocessing procedure on a file only for a prescribed time to prevent preprocessing from being persistently performed for damaged files. For example, the prescribed time for moving image files is set to 12 seconds and, if the preprocessing procedure of a file is not completed in 12 seconds, the file is regarded as a damaged one and the preprocessing procedure is no longer performed for it.

Figure 5:
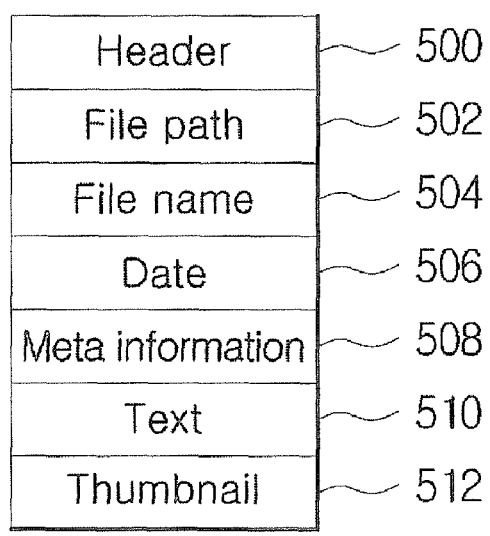
FIG. 5 illustrates the fields of a preprocessed file stored in a snapshot database according to a preferred embodiment of the invention.

FIG. 5 illustrates the fields of a preprocessed file stored in the snapshot database after it is preprocessed at the complex-structured file preprocessing unit shown in FIG. 4. As shown, the preprocessed file according to an embodiment of the invention may include a header field 500, a file path field 502, a file name field 504, a date field 506, a meta information field 508, a text field 510, and a thumbnail field 512.

In an embodiment, the file path field 502, the file name field 504, the date field 506, the meta information field 508, the text field 510, and the thumbnail field 512 among the fields of the preprocessed file stored in the snapshot database 208 are each set to variable in length. As each field is set to be variable in length, the header 500 stores not only preprocessed file identification information, which indicates that this file is a preprocessed file, but also offset information indicating respective start addresses of the fields.

Figure 6:
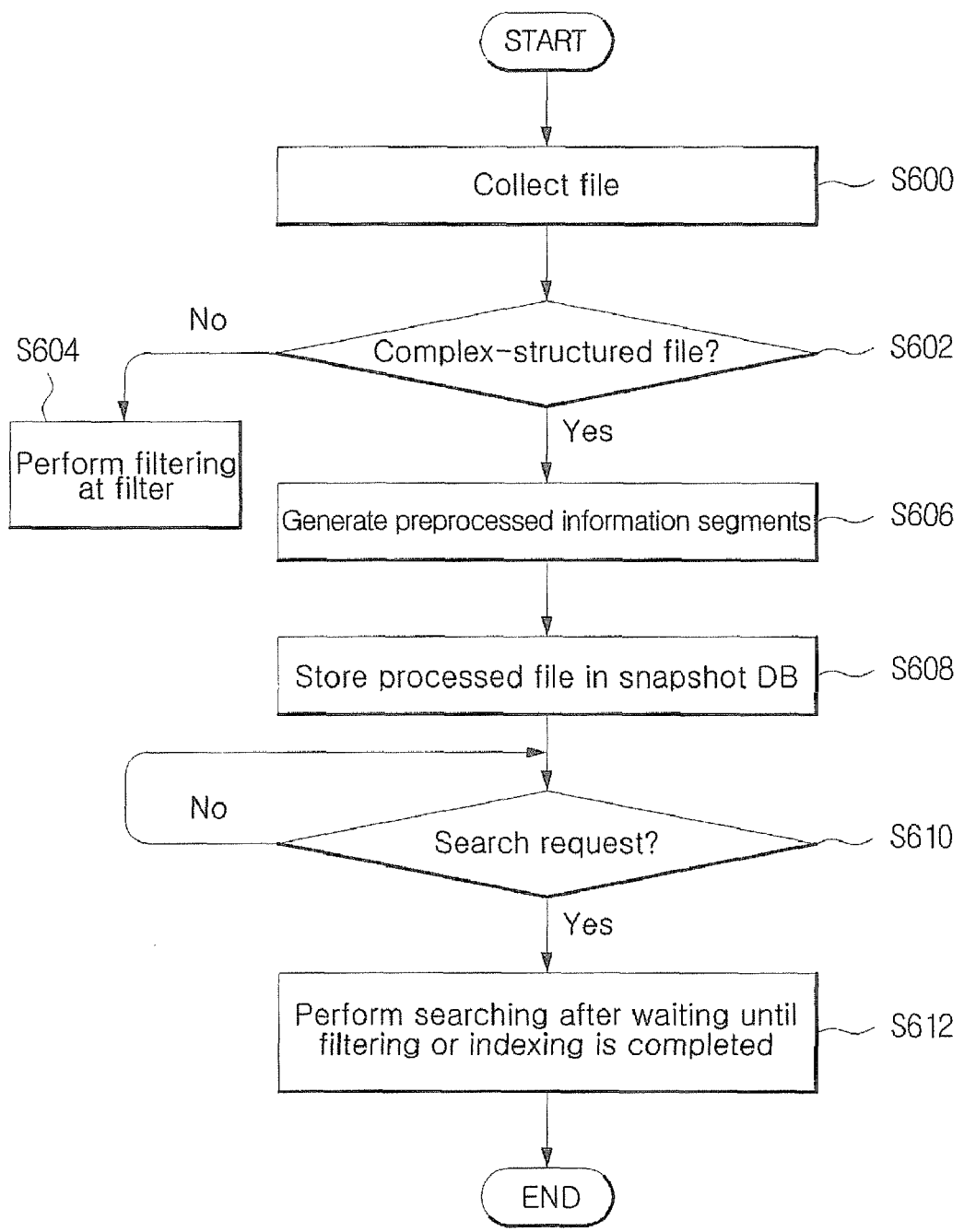
FIG. 6 is a flow chart illustrating an overall procedure of a local terminal search method for eliminating a search response delay according to a preferred embodiment of the invention.

FIG. 6 is a flow chart illustrating an overall procedure of a local terminal search method according to a preferred embodiment of the invention.

As shown in FIG. 6, the file collection unit 300 collects file information to be filtered in the local terminal (S600). Immediately after a program for searching the local terminal is installed on the local terminal, no filtered and indexed file information is stored in the index database 210. Accordingly, the file collection unit 300 searches files in the local terminal in each idle time and collects file information for indexing. When indexing of files in the local terminal has been performed to a certain extent, the file collection unit 300 monitors newly stored or changed files to collect corresponding file information. Whether or not the local terminal is in an idle time can be determined with reference to CPU usage, memory usage, or the like of the local terminal.

After collecting the file information, the file collection unit 300 determines whether or not a file corresponding to the collected file information is a complex-structured file (S602). Whether or not the corresponding file is a complex-structured file can be determined using extension information of the file. If the file corresponding to the collected file information is not a complex-structured file, the file collection unit 300 provides the collected file information to the filter 304 of the filtering unit 202 and the filter 304 performs filtering of the corresponding file (S604). If the file corresponding to the collected file information is a complex-structured file, the file collection unit 300 provides the collected file information to the complex-structured file preprocessing unit 204 and the complex-structured file preprocessing unit 204 performs preprocessing of the corresponding file to generate preprocessed information segments of the file (S606). The complex-structured file preprocessing unit 204 then combines the generated preprocessed information segments to generate a preprocessed file and then stores the preprocessed file in the snapshot database 208 (S608).

When receiving a search request from a user through the search interface program 212 (S610), the search/index unit 206 determines, independently of the above filtering procedure, whether or not filtering or indexing is in progress and performs searching after waiting until filtering or indexing is completed if the determination is that filtering or indexing is in progress (S612).

Since the filtering unit 202 performs filtering only on files which do not require a long time for the filtering or files that have been preprocessed by the complex-structured file preprocessing unit 204, the filtering is completed in a short time (for example, 1-2 seconds) and it is not necessary to wait a long time to process the search request as in the conventional method.

Figure 7:
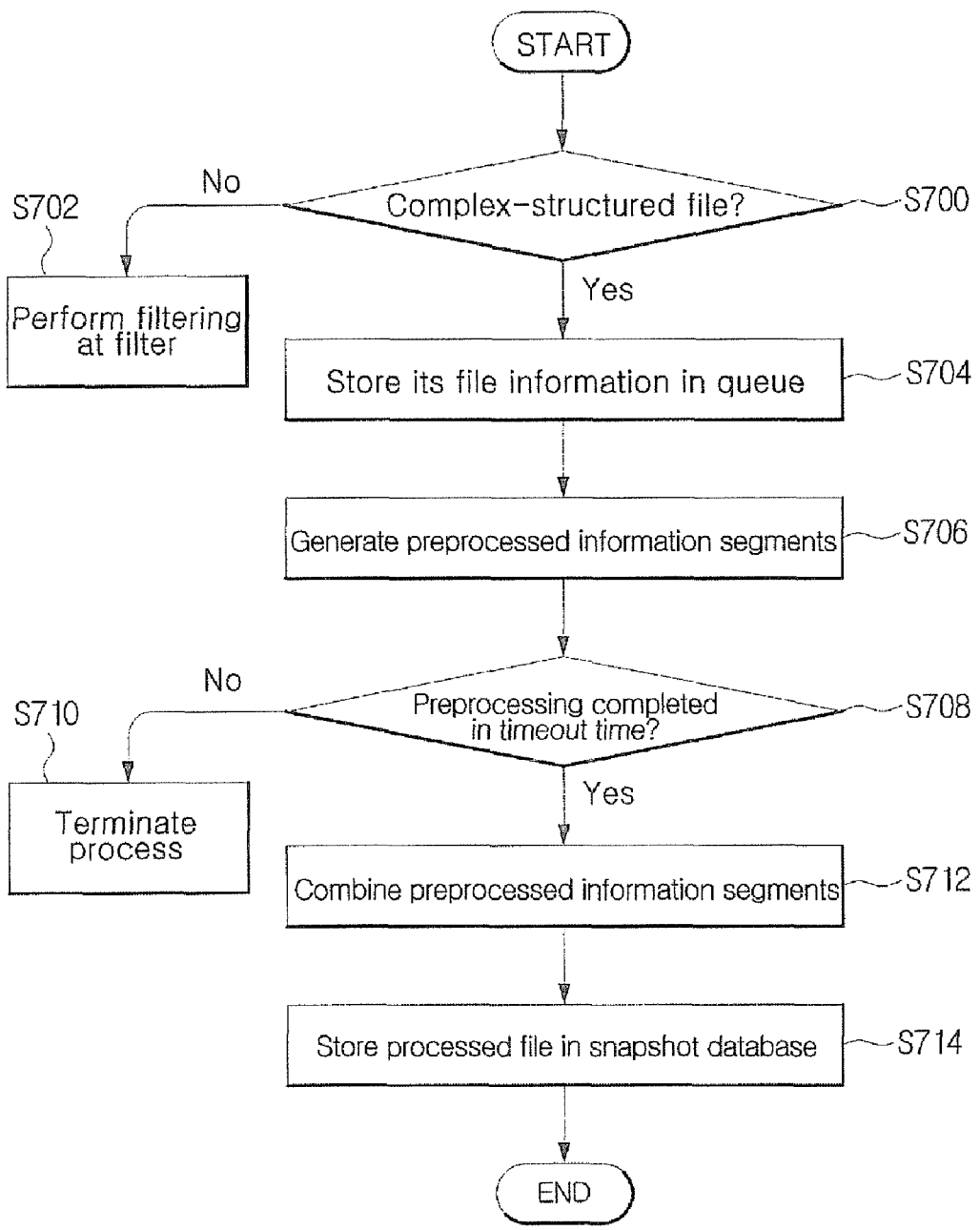
FIG. 7 is a flow chart illustrating a procedure for preprocessing a complex-structured file according to a preferred embodiment of the invention.

FIG. 7 is a flow chart illustrating a procedure for preprocessing a complex-structured file according to an embodiment of the invention. As shown, first, it is determined whether or not the file to be filtered is a complex-structured file (S700). If the file to be filtered is not a complex-structured file, file information (including path information) of the file is provided to the filter 304 of the filtering unit 202 and the filter 304 performs filtering (S702).

If the file to be filtered is a complex-structured file, file information (including path information) of the file is provided to the complex-structured file preprocessing unit 204 and the file information is stored in the queue 400 (S704).

Thereafter, the file extraction thread 402 extracts and provides file information stored in the queue 400 to the preprocessed information segment generator 404 to request preprocessing of a file corresponding to the file information stored in the queue. Then, the preprocessed information segment generator 404 performs preprocessing of the file to generate preprocessed information segments (S706). As described above, the preprocessed information segments may include a file name information segment, an extension information segment, a path information segment, a capacity information segment, a meta information segment, and a snapshot information segment (a thumbnail information segment when the file is an image file).

In an embodiment, the preprocessing may be performed on a file only for a prescribed time to prevent preprocessing from being persistently performed for damaged files. Specifically, it is determined whether or not the preprocessing of the file has been completed in a prescribed time (S708). If it is determined that the preprocessing of the file has not been completed in the prescribed time, the file preprocessing process is terminated (S710).

If it is determined that the preprocessing of the file has been completed in the prescribed timeout time, the generated preprocessed information segments are provided to the filter 304 of the filtering unit 202 and the filter 304 combines the provided preprocessed information segments to generate a preprocessed file (S712). The preprocessed file generated by the filter 304 is then stored in the snapshot database 208 (S714).

Although, in the above description of this embodiment, the procedure for combining and storing preprocessed information segments is performed by the filter 304, the same procedure may be performed by the complex-structured file preprocessing unit 204 as described above.

Figure 8:
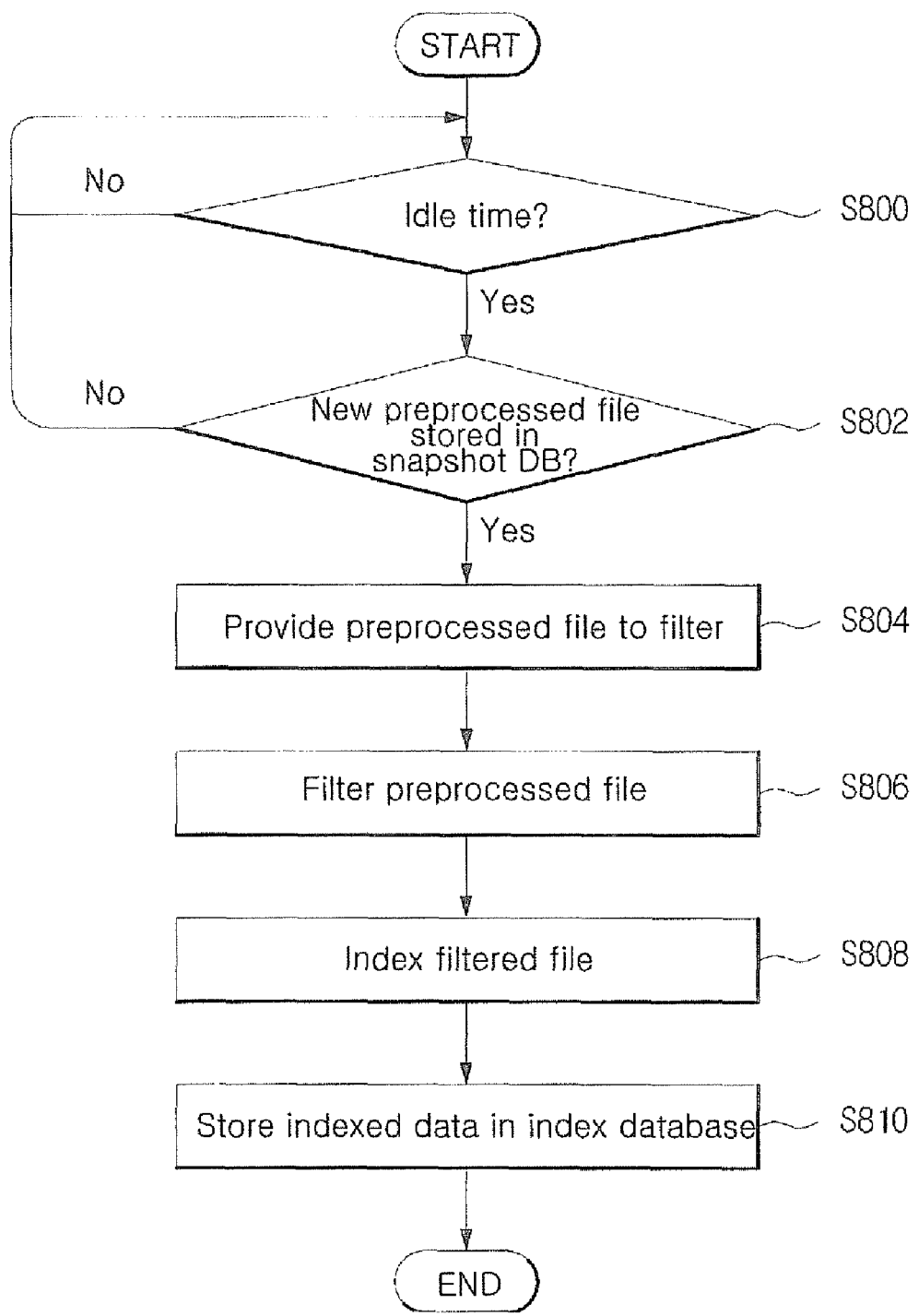
FIG. 8 is a flow chart illustrating a procedure in which a preprocessed file stored in the snapshot database is processed at the filtering unit according to a preferred embodiment of the invention.

FIG. 8 is a flow chart of a procedure in which the preprocessed file stored in the snapshot database is processed by the filtering unit according to a preferred embodiment.

The idle time monitoring unit 302 monitors the CPU or memory usage of the local terminal to determine whether or not the local terminal is in an idle time (S800). If the local terminal is in an idle time, it is determined whether or not a new preprocessed file has been stored in the snapshot database 208 (802).

If a new preprocessed file has been stored in the snapshot database 208, the idle time monitoring unit 302 requests the file collection unit 300 to perform filtering of the new preprocessed file and the file collection unit 300 then extracts and provides the preprocessed file stored in the snapshot database 208 to the filter 304 (S804). Alternatively, the idle time monitoring unit 302 may itself provide the preprocessed file stored in the snapshot database 208 to the filter 304.

The filter 304 performs a filtering process on the provided preprocessed file (S806). Since thumbnail information or the like has already been generated through the preprocessing process, the filter 304 only needs to perform filtering using offset information of the preprocessed file, so that it does not take a long time to complete filtering.

When the filtering is completed, the search/index unit 206 performs indexing of the filtered data (S808) and then stores the indexed data in the index database 210 (S810).

Figure 9:
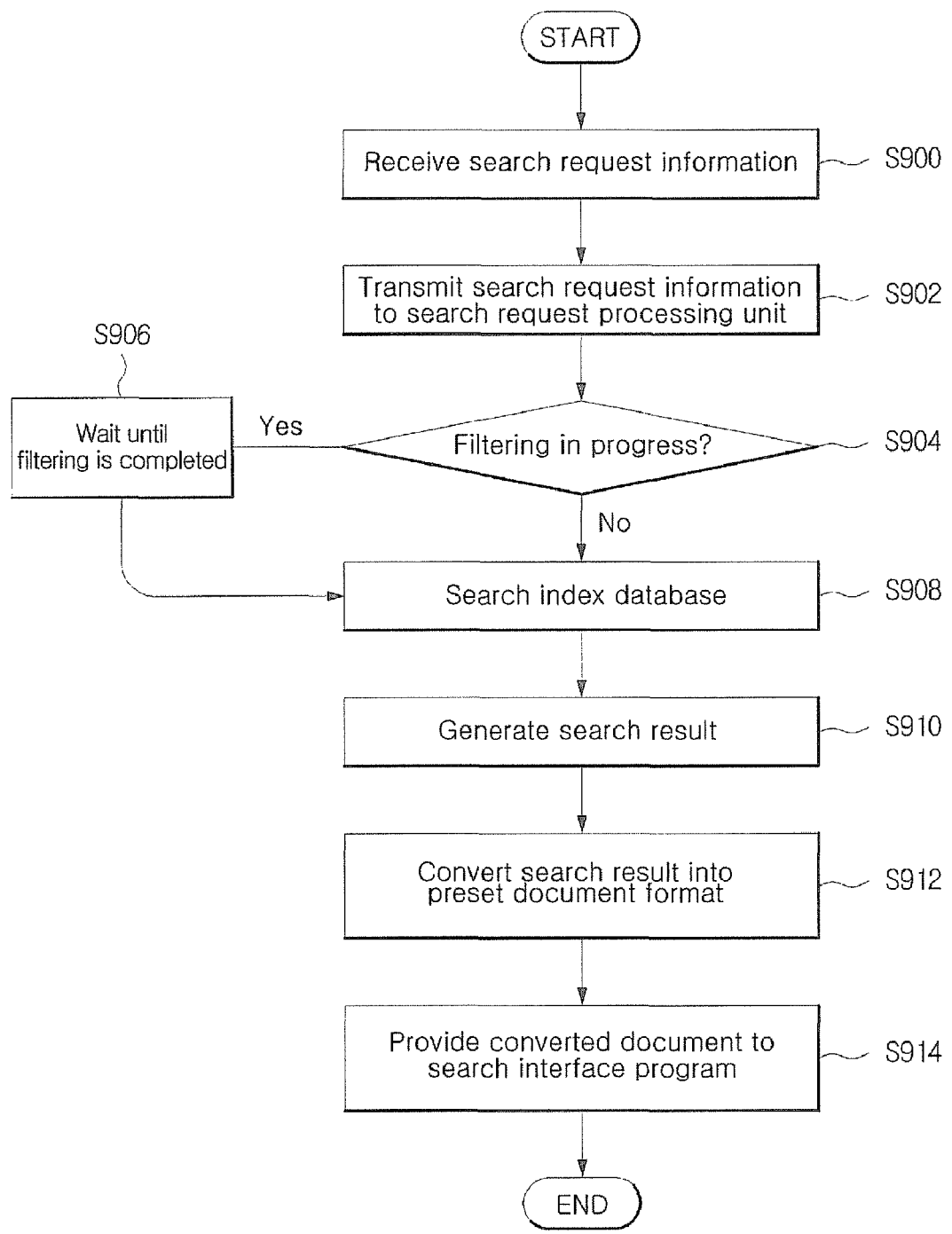
FIG. 9 is a flow chart illustrating a procedure in which a search result is provided in response to a search request according to a preferred embodiment of the invention.

FIG. 9 is a flow chart illustrating a procedure in which a search result is provided in response to a search request according to a preferred embodiment of the invention.

As shown in FIG. 9, the search interface program 212 receives a search keyword inputed by the user (S900). The user may also set a search category together with the search keyword.

The search interface program 212 generates search request information using the keyword inputed by the user and the category set by the user and provides the generated search request information to the search request processing unit 200 (S902).

The search request processing unit 200 converts the search request information into a prescribed format and provides it to the search/index unit 206 and the search/index unit 206 determines whether or not filtering or indexing is in progress (S904).

If filtering or indexing is in progress, the search/index unit 206 waits until the filtering or indexing is completed (S906). If filtering or indexing is not in progress, the search/index unit 206 performs searching using information stored in the index database 210 (S908).

The search/index unit 206 then generates and provides search result information to the search request processing unit 200 (S910) and the search request processing unit 200 converts the search result into a prescribed document format to allow the search interface program 212 to display the search result (S912). For example, when the search interface program 212 is a web browser, the search request processing unit 200 may convert the search result into a web document in HTML format.

The search request processing unit 200 provides the converted search result document to the search interface program 212 (S914) and the search interface program 212 displays the search result. As described above, when the search interface program 212 is a web browser, the search request processing unit 200 may provide the search result web document in HTTP format to the search interface program 212.

As is apparent from the above description, the present invention provides a local terminal search system, a filtering method used for the same, and a recording medium that stores a program for performing the method, which have a variety of advantages. For example, it is possible to minimize the delay of a response to a search request even when the user has made the search request during filtering and indexing processes. It is also possible to minimize the time required for filtering by performing a preprocessing process on files which require a long time for filtering and indexing processes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A local terminal search system that searches information stored in a local terminal, the system comprising:
   a search request processing unit configured to receive search request information and to provide the search result information to a user;
   a search/index unit configured to construct an index database by indexing information stored in the local computer and to search said index database using a search keyword in association with the search request information, the search/index unit receiving the search request information from the search request processing unit;
   one or more memories for storing said index database;
   a filtering unit, the filtering unit collecting information of files stored in the local terminal, the filtering unit determining whether files corresponding to the collected file information are complex-structured files, the filtering unit filtering the files if the files are not complex-structured files, and the filtering unit providing the filtered information to said search/index unit for indexing, wherein the complex-structured file being defined as a file that requires more than a prescribed threshold time for filtering of the file;
   a complex-structured file preprocessing unit configured to extract information required for filtering the file corresponding to the file information collected by the filtering unit to generate preprocessed information segments if the corresponding file is a complex-structured file; and
   a processor for controlling said filtering unit and said complex-structured file preprocessing unit,
   wherein a preprocessed file generated by combining the preprocessed information segments is stored in a snapshot database and the filtering unit performs filtering of the preprocessed file stored in the snapshot database during a period of time in which the processor can afford to perform the filtering,
   wherein the complex-structured file preprocessing unit generates preprocessed information segments for a prescribed time and terminates a corresponding preprocessing process if the prescribed time has elapsed,
   wherein the preprocessed information segment comprises at least one segment selected from the group consisting of a file name information segment, an extension information segment, a path information segment, a capacity information segment, a meta information segment, and a capture image information segment.

2. The local terminal search system of claim 1, wherein the complex-structured file comprises a moving image file or an audio file.

3. The local terminal search system of claim 1, wherein the filtering unit determines whether or not a file is a complex-structured file using extension information of the file.

4. The local terminal search system of claim 1, wherein the preprocessed file includes a header and respective fields that store the preprocessed information segments and each of the fields is set to be variable in length and the header stores start offset information of each of the fields.

5. The local terminal search system of claim 1, wherein the filtering unit includes:
   an idle time monitoring unit configured to determine whether or not the local terminal is in an idle time;
   a file collection unit, the file collection unit collecting information of files stored in the local terminal if the local terminal is in an idle time, the file collection unit determining whether a file corresponding to the collected file information is a complex-structured file, the file collection unit providing the collected file information to the complex-structured file preprocessing unit if the file corresponding to the collected file information is a complex-structured file; and
   a filter, the filter receiving a non-complex-structured file from the file collection unit, the filter filtering the received file, wherein the idle time monitoring unit monitors whether a new preprocessed file has been stored in the snapshot database and, if a new preprocessed file has been stored in the snapshot database, the file collection unit provides the new preprocessed file to the filter.

6. The local terminal search system of claim 1, wherein the complex-structured file preprocessing unit includes:
   a queue, the queue storing complex-structured file information received from the filter;
   a file extraction thread, the file extraction thread extracting complex-structured file information to be preprocessed from the queue; and
   a preprocessed information segment generator configured to analyze a file provided from the file extraction thread and extracts or generates information required for filtering.

7. The local terminal search system of claim 1, wherein, when the search request processing unit receives search request information, the search/index unit determines whether or not filtering is in progress at the filtering unit and processes a corresponding search request after waiting until filtering is completed if the determination is that filtering is in progress.

8. The local terminal search system of claim 6, wherein the preprocessed information segment generator generates preprocessed information segments for the prescribed time and terminates the corresponding preprocessing process if the prescribed time has elapsed.

9. A filtering method used for a local terminal search system, the filtering method comprising:
   at a computing device including a processor and a memory;
   collecting file information stored in a local terminal;
   determining whether a file corresponding to the collected file information is a complex-structured file, the complex-structured file being defined as a file that requires more than a prescribed threshold time for filtering of the file;
   filtering by said processor the file corresponding to the collected file information if the corresponding file is not a complex-structured file;
   extracting by said processor information required for filtering of the corresponding file to generate preprocessed information segments if the corresponding file is a complex-structured file;
   combining the generated preprocessed information segments to generate a preprocessed file; and
   storing the generated preprocessed file in a snapshot database;
   filtering by said processor the preprocessed file during a period of time in which the processor can afford to perform the filtering;
   indexing each filtered file to provide indexed data;
   storing the indexed data in an index database,
   wherein the extracting of the information required for filtering of the corresponding file is for a prescribed time and a corresponding preprocessing process terminates if the prescribed time has elapsed,
   wherein the preprocessed information segment comprises at least one segment selected from the group consisting of a file name information segment, an extension information segment, a path information segment, a capacity information segment, a meta information segment, and a capture image information segment.

10. The filtering method of claim 9, further comprising:
    determining whether or not a new preprocessed file has been stored in the snapshot database; and
    performing filtering of a new preprocessed file if the new preprocessed file has been stored in the snapshot database.

11. The filtering method of claim 10, further comprising:
    determining whether the local terminal is in an idle time;
    wherein collecting file information stored in the local terminal and filtering the new preprocessed file are performed during the idle time.

12. The filtering method of claim 9, further comprising:
    determining whether or nor the filtering is in progress;
    wherein a corresponding search request is processed after waiting until the filtering is completed if the determination is that the filtering is in progress.

13. The filtering method of claim 9,
    wherein the preprocessed file includes a header and respective fields that store the preprocessed information segments and each of the fields is set to be variable in length and the header stores start offset information of each of the fields.

14. One or more storage media having stored thereon a computer program that, when executed by one or more processors, causes the one or more processors to perform acts including:
    collecting file information stored in a local terminal;
    determining whether a file corresponding to the collected file information is a complex-structured file, the complex-structured file being defined as a file that requires more than a prescribed threshold time for filtering of the file;
    filtering the file corresponding to the collected file information if the corresponding file is not a complex-structured file;
    extracting information required for filtering of the corresponding file to generate preprocessed information segments if the corresponding file is a complex-structured file;
    combining the generated preprocessed information segments to generate a preprocessed file; and
    storing the generated preprocessed file in a snapshot database;
    filtering the preprocessed file during a period of time in which the processor can afford to perform the filtering;
    indexing each filtered file to provide indexed data;
    storing the indexed data in an index database,
    wherein the extracting of the information required for filtering of the corresponding file is for a prescribed time and a corresponding preprocessing process terminates if the prescribed time has elapsed,
    wherein the preprocessed information segment comprises at least one segment selected from the group consisting of a file name information segment, an extension information segment, a path information segment, a capacity information segment, a meta information segment, and a capture image information segment.

* * * * *